US008807667B2

(12) United States Patent
Park

(10) Patent No.: US 8,807,667 B2
(45) Date of Patent: Aug. 19, 2014

(54) HYDRAULIC BRAKE SYSTEM

(75) Inventor: Seung Young Park, Gyeonggi-do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 150 days.

(21) Appl. No.: 13/215,625

(22) Filed: Aug. 23, 2011

(65) Prior Publication Data

US 2012/0049616 A1   Mar. 1, 2012

(30) Foreign Application Priority Data

Aug. 23, 2010 (KR) .................. 10-2010-0081197

(51) Int. Cl.
F16L 55/04 (2006.01)

(52) U.S. Cl.
USPC .................. 303/113.1; 303/9.62; 138/31

(58) Field of Classification Search
CPC ....... B60T 8/4872; B60T 8/4068; B60T 8/26; B60T 17/04; B60T 13/686
USPC .......... 303/9.62, 9.63, 9.75, 87, 113.1–113.5, 303/186, 187, DIG. 11; 138/26, 30, 31; 417/540; 188/304
See application file for complete search history.

(56) References Cited

U.S. PATENT DOCUMENTS

| 4,989,924 | A | * | 2/1991 | Toda et al. | 303/113.1 |
| 5,210,382 | A | * | 5/1993 | Paley et al. | 181/209 |
| 6,231,132 | B1 | * | 5/2001 | Watanabe | 303/116.2 |
| 7,093,911 | B2 | * | 8/2006 | Hool et al. | 303/113.5 |
| 7,309,112 | B2 | | 12/2007 | Isono | |
| 8,430,459 | B2 | * | 4/2013 | Park et al. | 303/113.5 |
| 2010/0288388 | A1 | * | 11/2010 | Barale et al. | 138/31 |
| 2012/0043805 | A1 | * | 2/2012 | Park | 303/9.62 |

FOREIGN PATENT DOCUMENTS

| JP | 2602155 | 10/1999 |
| JP | 11-301443 | 11/1999 |
| JP | 2007-186142 | 7/2007 |

OTHER PUBLICATIONS

Chinese Office Action issued in Chinese Application No. 201110300222.1 issued on Dec. 3, 2013.

* cited by examiner

Primary Examiner — Bradley King
Assistant Examiner — Stephen Bowes
(74) Attorney, Agent, or Firm — McDermott Will & Emery LLP

(57) ABSTRACT

A hydraulic brake system includes a master cylinder forming a braking hydraulic pressure and wheel brakes receiving the braking hydraulic pressure and exerting a braking force. A first hydraulic circuit controls an oil pressure transmission by connecting a first port of the master cylinder and two wheel brakes, and a second hydraulic circuit controls the oil pressure transmission by connecting a second port of the master cylinder and remaining wheel brakes. A hydraulic block communicates main passages of the first and second hydraulic circuits with each other by a communication passage having one side opened. Pumps are mounted on the main passages to discharge oil toward the wheel brake or the master cylinder, and an orifice is mounted on each of the other side of the main passages. A damper assembly is coupled to the communication passage provided between an output port side of the pump and the orifice.

8 Claims, 2 Drawing Sheets

HYDRAULIC BRAKE SYSTEM

CROSS-REFERENCE(S) TO RELATED APPLICATION

This application claims priority of Korean Patent Application No. 10-2010-0081197, filed on Aug. 23, 2010, in the Korean Intellectual Property Office, which is hereby incorporated by reference in its entirety.

BACKGROUND OF THE INVENTION

1. Field of the Invention

The present invention relates to a brake system, and more particularly, to a hydraulic brake system capable of reducing pressure pulsation that is generated by a piston pump driven by a hydraulic motor upon operation of a brake system.

2. Description of the Related Art

A hydraulic brake system is essentially mounted on a vehicle, and a variety of systems for obtaining a stronger and more stable braking force have recently been proposed.

Examples of a hydraulic brake system include an Anti-lock Brake System (ABS), a Brake Traction Control System (BTCS), and a Vehicle Dynamic Control System (VDC). The ABS prevents wheels from skidding upon braking. The BTCS prevents slip of driving wheels against sudden departure or sudden unintended acceleration of a vehicle. The VDC stably maintains a driving state of a vehicle by controlling a brake oil pressure through a combination of the ABS and the BTCS.

Such a hydraulic brake system includes a master cylinder for generating a pressure necessary for braking, a plurality of solenoid valves for controlling a braking hydraulic pressure transmitted to a wheel brake of a vehicle, a low pressure accumulator for temporarily storing oil, a pump and a motor for forcibly pumping the oil stored in the low pressure accumulator, an orifice for reducing the pressure pulsation of the oil pumped by the pump, and an Electronic Control Unit (ECU) for electrically controlling the operations of the solenoids and the pump.

The valve assembly of the solenoids, the accumulator, the pump, and the motor are compactly installed in a hydraulic block (modulator block) made of aluminum, and the ECU is provided with an ECU housing in which the coil assembly of the solenoid valves and a circuit board are embedded, and is coupled to the hydraulic block.

However, in the conventional hydraulic brake system, as described above, rapid pressure pulsation generated by the driving of the pump in the process of increasing the braking pressure is reduced by the orifice provided in a discharge port side of the pump. Since this is achieved by a configuration that adjusts a cross-sectional area of a passage simply in order to reduce a damping, there is a limitation in completely reducing pressure pulsation.

In addition, another method for reducing pressure pulsation is to increase the number of pistons of a pump. This method increases the overall performance of a motor and the weight and volume of a module, leading to an increase in a manufacturing cost of the pump.

If a peak of pressure pulsation caused by the driving of the pump is successively generated, it may cause the generation of operating noise in a brake system.

SUMMARY OF THE INVENTION

An aspect of the present invention is directed to a hydraulic brake system capable of reducing periodic pressure pulsation generated by the driving of a pump.

According to an embodiment of the present invention, a hydraulic brake system includes: a master cylinder forming a braking hydraulic pressure according to an operation of a brake pedal; wheel brakes provided in front and rear wheels of a vehicle to receive the braking hydraulic pressure of the master cylinder and exert a braking force; a first hydraulic circuit controlling an oil pressure transmission by connecting a first port of the master cylinder and two wheel brakes; a second hydraulic circuit controlling an oil pressure transmission by connecting a second port of the master cylinder and remaining two wheel brakes; a hydraulic block communicating main passages of the first and second hydraulic circuits with each other, the hydraulic block being provided with a communication passage having one side opened, such that the first and second hydraulic circuits pass through the communication passage; a pump mounted on one side of each of the main passages, with reference to the hydraulic block, to discharge oil through the hydraulic block to the wheel brake side or the master cylinder side; an orifice mounted on each of the other side of the main passages, with reference to the hydraulic block; and a damper assembly coupled to a communication passage provided between the output port side of the pump and the orifice to communicate each main passages of the first and second hydraulic circuits. The damper assembly includes: a housing coupled to the inner periphery of the communication passage and mutually communicating with the main passages; a cap sealing the opened side of the communication passage and mounted on the hydraulic block; a piston embedded into the housing and reciprocating the communication passage; a spring mounted on both ends of the piston to elastically support the piston between the cap and the closed side of the communication passage; and a guide mounted on the inside of the cap and the closed side of the communication passage to restrict an operating displacement of the piston or reduce noise caused by shock.

In addition, the housing of the hydraulic brake system may be integrally formed with the orifice.

Furthermore, the housing of the hydraulic brake system may include an oil suction hole and an oil discharge hole, and the cross-sectional area of the oil discharge hole may be smaller than that of the oil suction hole.

DETAILED DESCRIPTION OF EXEMPLARY EMBODIMENTS

Figure 1:
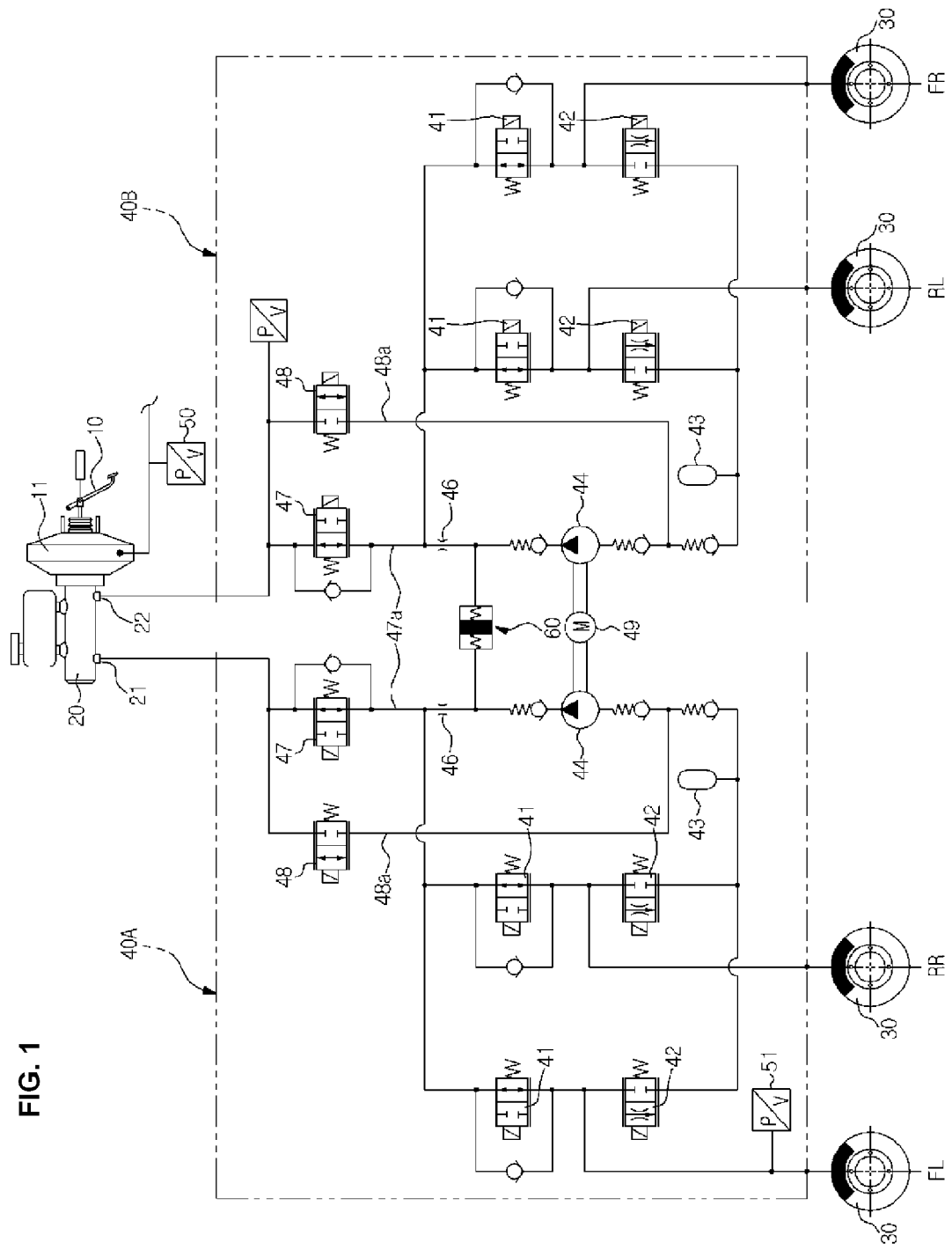
FIG. 1 is a view illustrating a hydraulic brake system according to an embodiment of the present invention.

Exemplary embodiments of the present invention will be described below in more detail with reference to the accompanying drawings. The present invention may be embodied in different forms and should not be construed as limited to the embodiments set forth herein.

A hydraulic brake system according to an embodiment of the present invention includes a brake pedal 10 for receiving a driver's manipulation force, a brake booster 11 for increasing foot power using a pressure difference between vacuum pressure and atmospheric pressure by the foot power of the brake pedal 10, a master cylinder 20 for generating a pressure by the brake booster 11, a first hydraulic circuit 40A for controlling an oil pressure transmission by connecting a first port 21 of the master cylinder 20 and two wheel brakes (or wheel cylinders) 30, and a second hydraulic circuit 40B for controlling an oil pressure transmission by connecting a second port 22 of the master cylinder 20 and the remaining two wheel brakes 30.

Figure 2:
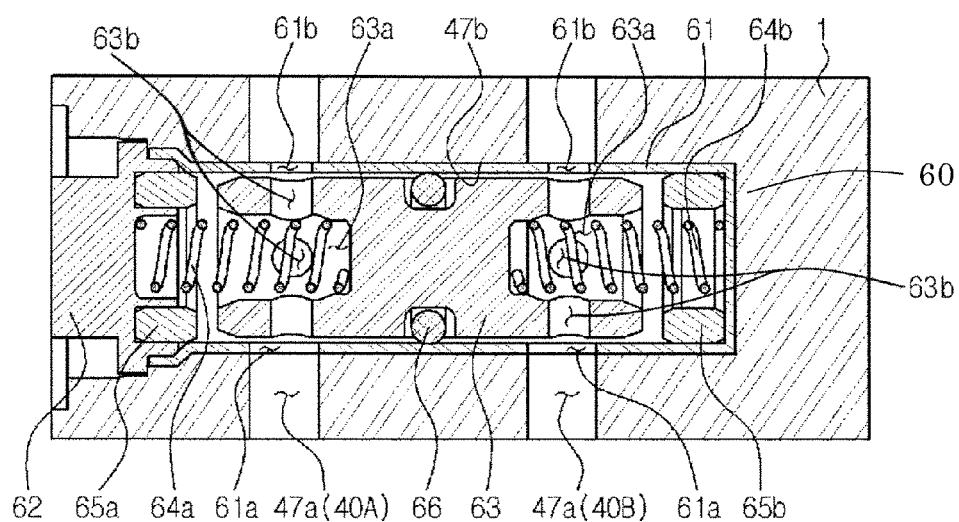
FIG. 2 is a sectional view illustrating a damper assembly of the hydraulic brake system according to the embodiment of the present invention.

The first hydraulic circuit 40A and the second hydraulic circuit 40B are compactly installed in the hydraulic block (1 in FIG. 2).

The first hydraulic circuit 40A and the second hydraulic circuit 40B include solenoid valves 41 and 42 for controlling a braking hydraulic pressure transmitted to two wheel brakes 30, a pump 44 for sucking oil leaking from the wheel brake 30 or the master cylinder 20, a low pressure accumulator 43 for temporarily storing oil leaking from the wheel brake 30, an orifice 46 for reducing pressure pulsation from oil pressure that is pumped from the pump 44, and an auxiliary passage 48a for guiding oil of the master cylinder 20 to be sucked into the inlet of the pump 44 in a TCS mode.

The plurality of solenoid valves 41 and 42 are coupled to an upstream and a downstream of the wheel brake 30. The plurality of solenoid valves 41 and 42 are classified into a normal open type solenoid valve 41 and a normal close type solenoid valve 42. The normal open type solenoid valve 41 is disposed in the upstream side of each wheel brake 30 and maintains an open state in a normal mode. The normal close type solenoid valve 42 is disposed in a downstream side of each wheel brake 30 and maintains a closed state in a normal mode.

The on-off operation of the solenoid valves 41 and 42 is controlled by an ECU (not shown) that detects a vehicle speed through a wheel speed sensor disposed in each wheel. When the normal close type solenoid valve 42 is opened according to the depressurizing braking, oil leaking from the wheel brake 30 is temporarily stored in the low pressure accumulator 43.

The pump 44 is driven by a motor 49 to transmit oil pressure toward the wheel brake 30 or the master cylinder 20 by sucking the oil stored in the low pressure accumulator 43 and discharge the sucked oil toward the orifice 46.

A damper assembly 60 for reducing pressure pulsation of the pump 44 is provided between a discharge port of the pump 44 and the orifice 46.

The damper assembly 60 will be described later.

A normal open type solenoid valve 47 for a traction control system (TCS) (hereinafter, referred to as a TC valve) is installed in a main passage 47a for connecting the master cylinder 20 and the outlet of the pump 44.

The TC valve 47 maintains an open state in a normal mode, and brake oil pressure generated in the master cylinder 20 by a general braking through the brake pedal 10 is transmitted to the wheel brake 30 through the main passage 47a.

The auxiliary passage 48a is branched from the main passage 47a and guides the oil of the master cylinder 20 to be sucked into the inlet of the pump 44. A shuttle valve 48 is installed such that the oil flows to only the inlet of the pump 44.

The electrically operating shuttle valve 48 is installed in the middle of the auxiliary passage 48a, and the shuttle valve 48 is closed in a normal mode and is opened in a TCS mode.

Meanwhile, a pressure sensor 50 for detecting vacuum pressure of the brake booster 11 and atmospheric pressure is installed in the brake booster 11, and a wheel pressure sensor 51 is provided in front left/right wheels FL and FR and rear left/right wheels RL and RR to detect actual braking pressures applied thereto.

The pressure sensors 50 and 51 are electrically connected to and controlled by the ECU.

The damper assembly 60 is press-fitted into a communication passage 47b provided to communicate with each main passage 47a of the first and second hydraulic circuits 40A and 40B installed in the hydraulic block.

As illustrated in FIG. 2, the damper assembly 60 includes a cylindrical housing 61 and a cap 62. One side of the housing 61 is opened, and the housing 61 is press-fitted from the opened side of the communication passage 47b. The cap 62 is press-fitted or spirally coupled to seal the opening of the housing 61.

An oil suction hole 61a and an oil discharge hole 61b are provided in the outside of the housing 61 to communicate with the first and second hydraulic circuits 40A and 40B.

A piston 63 is provided in the inside of the housing 61 such that it is reciprocatably movable in the center of the housing 61 along the longitudinal direction. Springs 64a and 64b elastically support the piston 63 at both ends thereof. Guides 65a and 65b are provided to restrict the operating displacement of the piston 63 or reduce noise caused by shock.

The piston 63 is provided with a rubber seal member 66 for isolating and sealing the first and second hydraulic circuits 40A and 40B at the periphery of the central portion. Hollows 63a for receiving and supporting the springs 64a and 64b are provided at both ends of the piston 63.

In addition, a plurality of communication holes 63b are provided on both ends of the piston 63. The plurality of communication holes 63b are penetrated perpendicular to the forming direction of the hollows 63a and connected to the first and second hydraulic circuits 40A and 40B.

The guide 65a is installed inside the cap 62, and the guide 65b is installed in the end of the housing 61 and spaced apart from the piston 63, thereby forming a damping space. A recess depth of the hollow 63a is appropriately determined such that the operating displacement of the piston 63 is restricted.

It is apparent that the depth of the hollow 63a can be appropriately varied so as to restrict the operating displacement of the piston 63, that is, the piston 63 can be replaced with a piston having various depths.

The distance from the inside of the cap 62 to the end of the guide 65a and the distance from the closed side of the communication passage 47b to the end of the guide 65b may be appropriately varied so as to restrict the operating displacement of the piston 63 together with the hollow 63a of the piston 63, that is, a guide having various thicknesses can be adopted and coupled instead.

In addition, the guides 65a and 65b may be made of an elastic member so as to reduce noise caused by shock. Specifically, the guides 65a and 65b may be made of rubber, synthetic rubber, or synthetic resin, for example, urethane or polyurethane, so as to reduce frictional noise caused by the reciprocation of the piston 63.

Since the above-described damper assembly 60 can control the pressure pulsations of both the first and second hydraulic circuits 40A and 40B using the single piston 63, it is superior in terms of energy efficiency.

In addition, since the damper assembly 60 is provided in an assembly type and can be coupled to the hydraulic block 1, the assembly thereof is facilitated.

Hereinafter, the overall operation of the hydraulic brake system according to the embodiment of the present invention will be described.

First, a driver presses down the brake pedal 10 so as to slow down the vehicle while driving or maintain a stationary state.

Therefore, a boosted force higher than the input force is generated in the brake booster 11, and a considerable braking hydraulic pressure is generated in the master cylinder 20.

The braking operation is performed in such a manner that the braking hydraulic pressure is transmitted to the front wheels FR and FL and the rear wheels RR and RL through the solenoid valve 41.

If the driver takes his/her foot off the brake pedal 10 gradually or completely, oil pressure inside each wheel brake is returned to the master cylinder 20 through the solenoid valve 41. Thus, the braking force is reduced or the braking operation is completely released.

Meanwhile, pressure pulsation having a regular half sine wave is generated in the brake system due to a pair of pumps 44 that is driven with 180-degree phase difference by a single driving motor 49 during the braking operation. This pressure pulsation is attenuated by the damper assembly 60.

That is, the pressure of oil discharged through the discharge port side of the pump 44 is supplied to the damper assembly 60 whose cross-sectional area is varied by the piston 63 and the springs 64*a* and 64*b*. Thus, the pressure between the hydraulic circuits 40A and 40B is balanced and most pressure pulsation is attenuated.

Therefore, the pressure pulsation of the regular half sine wave is completely removed by the damper assembly 60 and the orifice 46, and the regular oil pressure is transmitted to the master cylinder 20 or the solenoid valve 41.

Although it has been described in the above embodiment that the damper assembly 60 and the orifice 46 are separately provided, the damper assembly 60 and the orifice 46 may also be integrally provided.

For example, as illustrated in FIG. 2, the oil discharge hole 61*b* may serve to perform the function of the orifice 46 by forming the oil discharge hole 61*b* to have a smaller cross-sectional area than that of the oil suction hole 61*a*.

According to the hydraulic brake system of the present invention, the damper assembly is installed between the outlet port of the pump and the orifice to attenuate pressure pulsation generated by the driving of the pump. Therefore, the overall operating noise during the brake control is reduced and the reliability of products is increased.

Moreover, since the damper assembly is provided in a single sub assembly type, its assembly and installation in the hydraulic block are facilitated.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A hydraulic brake system comprising:
a master cylinder forming a braking hydraulic pressure according to an operation of a brake pedal;
wheel brakes provided in front and rear wheels of a vehicle to receive the braking hydraulic pressure of the master cylinder and exert a braking force;
a first hydraulic circuit controlling an oil pressure transmission by connecting a first port of the master cylinder and two wheel brakes;
a second hydraulic circuit controlling an oil pressure transmission by connecting a second port of the master cylinder and remaining two wheel brakes;
a hydraulic block communicating main passages of the first and second hydraulic circuits with each other, the hydraulic block being provided with a communication passage having one side opened, such that the first and second hydraulic circuits pass through the communication passage;
a pump mounted on one side of each of the main passages, with reference to the hydraulic block, to discharge oil through the hydraulic block toward the wheel brake or the master cylinder;
an orifice mounted on each of the other side of the main passages, with reference to the hydraulic block; and
a damper assembly including:
a housing coupled to the inner periphery of the communication passage and mutually communicating with the main passages;
a cap sealing the opened side of the communication passage and mounted on the hydraulic block;
a piston embedded into the housing and reciprocating in the communication passage;
a spring mounted on each end of the piston to elastically support the piston between the cap and the closed side of the communication passage; and
a guide mounted on the inside of the cap on the closed side of the communication passage to restrict an operating displacement of the piston or reduce noise caused by shock, wherein
the damper assembly further includes a plurality of communication holes that penetrate perpendicular to a reciprocating direction of the piston and connected to the first and second hydraulic circuits, and
a hollow, that is a recessed space at each end of the piston in a longitudinal direction of the damper assembly in the housing, in which each spring is disposed to support each end of the piston, and communicating with the first and second hydraulic circuits and having a variable depth to restrict the operating displacement of the piston.

2. The hydraulic brake system according to claim 1, wherein
the housing is provided with an oil discharge hole penetrated corresponding to the other side of each of the main passages,
an oil suction hole penetrated corresponding to the side of each of the main passages, and
the cross-sectional area of the oil discharge hole is smaller than the cross-sectional area of the oil suction hole.

3. The hydraulic brake system according to claim 2, wherein the oil suction hole and the oil discharge hole are provided in the housing to communicate with the first and second hydraulic circuits.

4. The hydraulic brake system according to claim 1, wherein the damper assembly is coupled to and disposed in the hydraulic block, and the damper assembly further includes a seal member that mutually isolates the first hydraulic circuit from the second hydraulic circuit along an outer periphery of a central portion of the piston.

5. The hydraulic brake system according to claim 1, wherein the damper assembly further includes a damping space that is formed between both ends of the piston and the guide and reduces pulsation.

6. The hydraulic brake system according to claim 1, wherein the guide is made of an elastic material.

7. The hydraulic brake system according to claim 1, wherein the distance from the cap to the end of the guide and the distance from the closed side of the communication passage to the end of the guide is variable to restrict the operating displacement of the piston.

8. The hydraulic brake system according to claim 1, wherein another side of the communication passage is closed.

* * * * *